United States Patent
Walter

(10) Patent No.: US 9,828,118 B2
(45) Date of Patent: Nov. 28, 2017

(54) METHOD AND DEVICE FOR ASSISTING THE PILOTING OF AN AIRCRAFT DURING A PARABOLIC FLIGHT

(71) Applicant: Airbus Operations SAS, Toulouse (FR)

(72) Inventor: Stéphane Walter, Brax (FR)

(73) Assignee: Airbus Operations SAS (FR)

( * ) Notice: Subject to any disclaimer, the term of this patent is extended or adjusted under 35 U.S.C. 154(b) by 0 days.

(21) Appl. No.: 15/070,478

(22) Filed: Mar. 15, 2016

(65) Prior Publication Data
US 2016/0272345 A1    Sep. 22, 2016

(30) Foreign Application Priority Data

Mar. 17, 2015  (FR) ...................... 15 52208

(51) Int. Cl.
*B64G 7/00*  (2006.01)
*G05D 1/06*  (2006.01)
(Continued)

(52) U.S. Cl.
CPC ............... *B64G 7/00* (2013.01); *B64D 45/00* (2013.01); *G01C 23/005* (2013.01); *G05D 1/0607* (2013.01)

(58) Field of Classification Search
CPC ........ B64D 45/00; B64G 7/00; G01C 23/005; G05D 1/0607
See application file for complete search history.

(56) References Cited

U.S. PATENT DOCUMENTS 2,153,857 A * 4/1939 Wheeler ............... H04B 3/147
                                                        330/176
2,680,193 A * 6/1954 Noxon ................. G05D 1/0202
                                                        327/231
(Continued)

FOREIGN PATENT DOCUMENTS

EP           486346 A1 *  5/1992

OTHER PUBLICATIONS

Doolittle, James H., "Wing loads as determined by the accelerometer", Master's Thesis, Massachusetts Institute of Technolohy, 1924, 40 pages.* Hosman, Ruud J.A.W., "Flight director guidance throughout the parabolic maneuver", 1999 IEEE International Conference on Systems, Man, and Cybernetics, 1999, IEEE SMC '99 Conference Proceedings, pp. V-1076-V-1081.*

(Continued)

*Primary Examiner* — Behrang Badii
*Assistant Examiner* — David Testardi
(74) *Attorney, Agent, or Firm* — Lerner, David, Littenberg, Krumholz & Mentlik, LLP

(57) ABSTRACT

A pilot assistance device includes information sources for determining automatically, in real time, a current vertical load factor of the aircraft, a computation unit for computing automatically, in real time, a flight director value using the current vertical load factor and a target vertical load factor representing a vertical load factor desired for the aircraft in the parabolic flight, the flight director value being computed in such a way as to be equal to a reference value when the current vertical load factor becomes equal to the target vertical load factor, and a display unit for presenting automatically, in real time, on a load factor scale, displayed on a screen of the cockpit of the aircraft, an indicator representative of the flight director value, computed by the computation unit, and an indicator indicating the reference value.

7 Claims, 3 Drawing Sheets

(51) Int. Cl.
 *B64D 45/00* (2006.01)
 *G01C 23/00* (2006.01)

(56) References Cited

U.S. PATENT DOCUMENTS

| | | | | |
|---|---|---|---|---|
| 2,776,428 | A * | 1/1957 | Hassler | G05D 1/0202 244/185 |
| 2,860,335 | A * | 11/1958 | Kellogg | G01S 1/02 244/185 |
| 4,440,093 | A * | 4/1984 | Kakehi | B60G 17/018 105/164 |
| 5,243,544 | A * | 9/1993 | Schoess | G01P 1/127 702/141 |
| 5,694,439 | A * | 12/1997 | Doyle | H03F 3/45085 375/350 |
| 5,707,026 | A * | 1/1998 | Lefebvre | B64C 13/16 117/901 |
| 5,971,319 | A * | 10/1999 | Lichtenberg | B64D 11/00 244/1 R |
| 8,209,069 | B1 * | 6/2012 | McLoughlin | G01C 21/165 244/158.1 |
| 8,241,133 | B1 | 8/2012 | Lewis et al. | |
| 9,321,523 | B2 * | 4/2016 | Delporte | G01C 23/00 |
| 2007/0018054 | A1 * | 1/2007 | Enzinger | B64C 13/16 244/195 |
| 2008/0078875 | A1 | 4/2008 | Diamandis et al. | |

OTHER PUBLICATIONS

Kraeger, A.M. et al., "Micro- and partial gravity atmospheric flight", AIAA Atmospheric Flight Mechanics Conference and Exhibit, Guidance, Navigation, and Control and Co-located Conferences, Aug. 5-8, 2002, Monterey, California, Paper AIAA 2002-4499, 11 pages.*

Masselink, B. et al., "Design and evaluation of a flight director for zero and partial gravity flight", AIAA Guidance, Navigation, and Control Conference, Aug. 10-13, 2009, Chicago, Illinois, Paper AIAA 2009-5987, 27 pages.*

Millis, Marc, "Acceleration Display System for Aircraft Zero-Gravity Research", NASA Technical Memorandum 87358, Mar. 1987, 21 pages.*

Precision Filters brochure, "LP6F & LP6P, 6-pole, 6-zero flat/pulse low-pass filter", P8477 Rev., Copyright © 2013 by Precision Filters, Inc., 2 pages.*

Rieke, W.J. et al., "Low Gravity Guidance System for Airborne Microgravity Research", NASA Technical Memorandum 107139, AIAA-96-0936, Jan. 15-18, 1996, 8 pages plus report documentation page.* van den Heuvel, J.M.M. et al., "Design of a partial gravity flight director", AIAA Guidance, Navigation and Control Conference and Exhibit, Aug. 18-21, 2008, Honolulu, Hawaii, Paper AIAA 2008-7159, 21 pages.*

French Search Report (FR 15 52208) dated Mar. 2, 2016.

* cited by examiner

METHOD AND DEVICE FOR ASSISTING THE PILOTING OF AN AIRCRAFT DURING A PARABOLIC FLIGHT

FIELD OF THE INVENTION

The present invention relates to a method and a device for assisting in the piloting of an aircraft in a parabolic flight Although not exclusively, the present invention applies more particularly to a parabolic flight in order to generate a weightlessness in the aircraft. It is known that the weightlessness corresponds to a zero gravity situation and represents the state of a body, in particular of a human body, which is such that the set of the gravitational and inertial forces to which it is subjected has a resultant and a resulting moment that are nil. It is possible to obtain weightlessness conditions, in an airliner, by bringing the latter onto a parabolic trajectory.

BACKGROUND OF THE INVENTION

More specifically, a particular parabolic flight, called "0 g" flight, g being the acceleration of gravity, makes it possible to generate, for some tens of seconds, a 0 acceleration (in all directions, although it is the vertical direction that is primarily considered in the context of the present invention) and therefore the conditions of weightlessness in the aircraft. Such a flight is, generally, provided with a tolerance of $5/100^{th}$ g about 0 g.

A flight director has been developed to guide the pilots between the pitch-down and pull-up actions during such a 0 g flight. This flight director indicates a predefined sought position of the (control) column to follow a parabolic trajectory at 0 g. This predefined position of the column is computed, before the flight, as a function of parameters linked to the aircraft, such as the weight, the centering, the balance, aerodynamic parameters, the thrust, etc.

This flight director only makes it possible to compute an estimation of the parabolic trajectory generating a 0 g flight and does so for various reasons:
- it is not possible to know the different parameters of the aircraft accurately enough to compute the trajectory with the desired accuracy; and
- the factors external to the aircraft which influence the load factor (for example movements of the air) are not taken into account.

This flight director therefore indicates a position of the column which may present a slight offset with the position making it possible to perform a precise 0 g flight. The pilot is therefore also obliged to follow a load factor indicator (g-meter) in addition to this flight director, to perform a parabolic flight.

BRIEF SUMMARY OF THE INVENTION

An aspect of the present invention may remedy this drawback. It relates to a method for assisting in the piloting of an aircraft in a parabolic flight, for example in order to generate a weightlessness in the aircraft, which makes it possible to provide accurate assistance to the pilot such that he or she knows, at all times, directly and immediately, using indications supplied by said method alone, what action(s) he or she must carry out to control the parabolic flight.

According to an aspect of the invention, said method for assisting in the piloting of an aircraft in a parabolic flight is noteworthy in that it comprises a series of steps, implemented automatically and repetitively, in a parabolic flight of the aircraft and consisting in real time:

a) in determining at least one current vertical load factor of the aircraft;

b) in computing a flight director value using said current vertical load factor and a target vertical load factor, by applying a filtering to said current vertical load factor to attenuate variations at high frequencies and by performing a correction to correct a time offset generated by the filtering, the target vertical load factor being a vertical load factor desired for the aircraft in the parabolic flight, said flight director value being computed in such a way as to be equal to a reference value when the current vertical load factor becomes equal to said target vertical load factor; and c) in presenting, on at least one load factor scale, displayed on a screen of the cockpit, a first indicator representative of said flight director value, computed in the step b), and a second indicator indicating said reference value.

Thus, by virtue of an aspect of the invention, the flight director value (which is such that it cancels out when the aircraft is in an optimal position for having the aircraft fly according to the desired parabolic flight, making it possible for example to create a weightlessness) is computed, during the flight, in real time, and is adapted to the current situation of the aircraft, and notably to its current vertical load factor. This flight director value is supplied to the pilot via said first indicator, which makes it possible to indicate to the pilot, at all times, the actions to be performed on the aircraft to obtain an optimal piloting.

Consequently, an aspect of the present invention provides assistance to the pilot by indicating to him or her, in real time, directly and accurately, what action(s) he or she must implement on the aircraft to perform the parabolic flight sought via the indicator displayed on the load factor scale.

A vertical load factor of the aircraft represents the "vertical" component of the load factor, which is defined in a direction forming part of the "vertical" plane of symmetry of the aircraft and orthogonal to a general plane of the wings of the aircraft.

In a preferred embodiment, said target vertical load factor (that is to say the vertical load factor sought to which the aircraft must be subjected) is nil so as to generate, as parabolic flight, a 0 g flight.

However, the abovementioned method may make it possible to implement other parabolic flights, for which the aircraft follows, for a certain time, a parabolic trajectory with a constant vertical load factor (corresponding to said target vertical load factor) which is not nil and has a desired given value.

It will be noted that said filtering makes it possible to attenuate high frequency variations to filter disturbances due to turbulences, as specified below.

Furthermore, preferably, said correction is performed using a correcting term which is proportional to a derivative of an estimated load factor value.

Furthermore, in a preferred embodiment, the step b) consists in computing said flight director value FD, using the following expression:

$$FD = K \times \left[ 1 + \frac{Nz}{1+\tau_1 \cdot s} - Nzt + \left( k_q \times k_1 \times \frac{V_{TAS}}{g} \times \frac{q}{1+\tau_2 \cdot s} \times \frac{\tau_1 \cdot s}{1+\tau_1 \cdot s} \right) \right]$$

in which:
K is a constant representing a scale factor;
Nz is the current vertical load factor;
Nzt is the target vertical load factor;
$V_{TAS}$ is a current true speed of the aircraft;
q is a current pitch speed of the aircraft;
$k_q$ and $k_1$ are predetermined constants; and
$\tau_1$ and $\tau_2$ are time constants.

Preferably, at least one of said constants K, $k_q$, $\tau_1$ and $\tau_2$ depends on a current flight phase of the aircraft.

The present invention relates also to a device for assisting in the piloting of an aircraft in a parabolic flight, in particular in order to generate a weightlessness in the aircraft.

According to an embodiment of the invention, said piloting assistance device is noteworthy in that it comprises:
- a set of information sources, configured to determine automatically, in real time, at least one current vertical load factor of the aircraft;
- a computation unit configured to compute automatically, in real time, a flight director value using said current vertical load factor and a target vertical load factor, the target vertical load factor being a vertical load factor desired for the aircraft in the parabolic flight, said flight director value being computed in such a way as to be equal to a reference value when the current vertical load factor becomes equal to said target vertical load factor, the computation unit being configured to apply a filtering to said current vertical load factor in order to attenuate variations at high frequencies and to perform a correction in order to correct a time offset generated by the filtering; and
- a display unit configured to present automatically, in real time, on at least one load factor scale, displayed on a screen of the cockpit, a first indicator representative of said flight director value, computed by said computation unit, and a second indicator indicating said reference value.

The present invention relates also to a manual piloting system of an aircraft, comprising at least one control column suitable for being actuated by a pilot to modify its position and configured to act on at least one elevator in order to generate a piloting of the aircraft on the pitch axis as a function of the position of said control column, said manual piloting system also comprising at least one piloting assistance device such as that mentioned above.

The present invention relates further to an aircraft, in particular a transport airplane, which is provided with such a piloting assistance device and/or such a manual piloting system.

BRIEF DESCRIPTION OF THE DRAWINGS

The attached figures will give a clear understanding of how the invention can be produced. In these figures, identical references denote similar elements.

DETAILED DESCRIPTION

Figure 1:
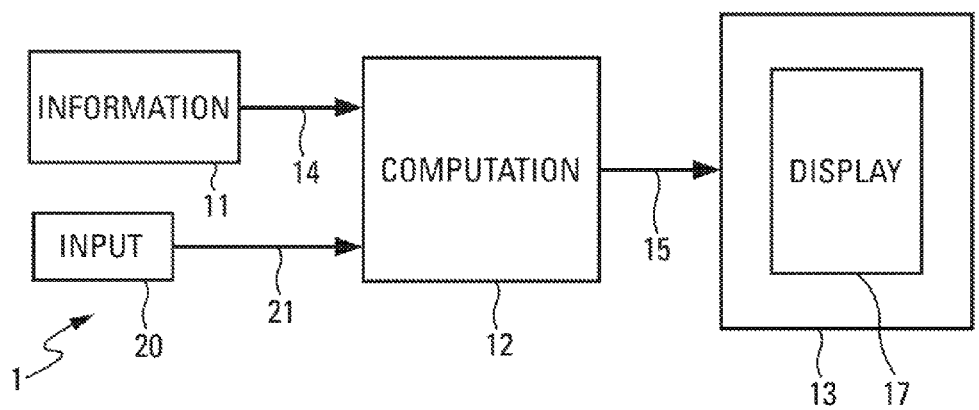
FIG. 1 is the block diagram of a device for assisting in the piloting of an aircraft which illustrates an embodiment of the invention.

The device 1 represented schematically in FIG. 1 and making it possible to illustrate the invention, is intended to assist in the piloting of an aircraft AC (FIG. 2), notably of a civilian transport airplane, in a parabolic flight, in particular in order to generate a weightlessness in the aircraft AC.

A parabolic flight should be understood to be a flight during which the aircraft AC is brought onto a standard trajectory of generally parabolic form, making it possible to obtain a constant load factor inside said aircraft AC, for a certain time, generally of the order of twenty or so seconds. Preferably, although not exclusively, the load factor sought is nil so as to obtain a situation of weightlessness.

The computation of a parabolic trajectory, making it possible for example to create conditions of weightlessness, is known and is not described more in the present description.

The device 1 is used in a flight performed manually by a pilot by acting notably on a standard control column 2 of the aircraft AC, forming part of a manual piloting system 3.

Figure 2:
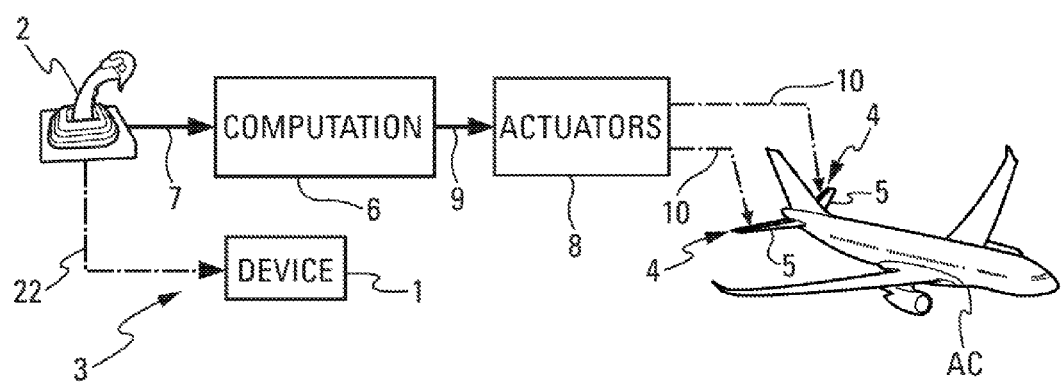
FIG. 2 schematically shows a manual piloting system comprising a piloting assistance device.

As represented schematically and very generally in FIG. 2, this manual piloting system 3 comprises:
- the standard control column 2 which is suitable for being actuated (by being moved (pivoted) forward or backward) by a pilot to modify its position (that is to say its deflection) and which is configured to act on elevators 4 of the aircraft AC, arranged on the horizontal tail units 5 of the aircraft AC, in order to generate a piloting of the aircraft AC on the pitch axis;
- a computer 6 ("COMPUTATION") which computes, in the standard manner, as a function of the position of the control column 2 (expressed by a deflection angle) received via a link 7, a control command which is transmitted via a link 9 to a set 8 of actuators ("ACTUATORS") associated with the elevators 4 of the aircraft AC; and
- said elevators 4 which are turned by the action of the associated actuators, as indicated schematically by the chain-dotted line arrows 10 in FIG. 2.

Although the piloting system 3 is represented outside the aircraft AC in this FIG. 2 for drawing simplification reasons, it is of course embedded thereon.

In the context of the present invention, the piloting system considered may correspond to a system with electric flight controls, as represented in FIG. 2, or to a system with mechanical flight controls.

According to an embodiment of the invention, said piloting assistance device 1 ("DEVICE") which is also embedded on the aircraft AC and which for example forms part of the manual piloting system 3 (FIG. 2) comprises, as represented in FIG. 1:
- a set 11 of information sources ("INFORMATION"), which is configured to determine automatically, in real time, at least one current vertical load factor (hereinafter "current load factor") of the aircraft;
- a computation unit 12 ("COMPUTATION") configured to compute automatically, in real time, a flight director value FD using said current load factor (received from the set 11 via a link 14) and a target vertical load factor (hereinafter "target load factor"). The target load factor is the vertical load factor desired (or sought) for the aircraft in the parabolic flight. The flight director value FD is computed in such a way as to be equal to a reference flight director value (generally equal to zero) when the current load factor becomes equal to said target load factor, as specified hereinbelow; and a display unit 13 which is linked via a link 15 to the computation unit 12.

Within the meaning of the present invention, a flight director is therefore a value representative of physical quantities linked to the aircraft, which is indicated to the pilot in real time. An action of the pilot on the controls of the aircraft enables him or her to modify this value, in order to make it equal to its reference value. When the current flight director value is equal to its reference value the aircraft is piloted according to the desired trajectory. The pilot can therefore pilot his or her aircraft by focusing his or her attention on this flight director value, and by acting on the controls of the aircraft to bring the current flight director value to its reference value (in practice equal to zero).

In the present description, the current flight director value is denoted FD, and the reference flight director value is equal to zero.

Figure 3:
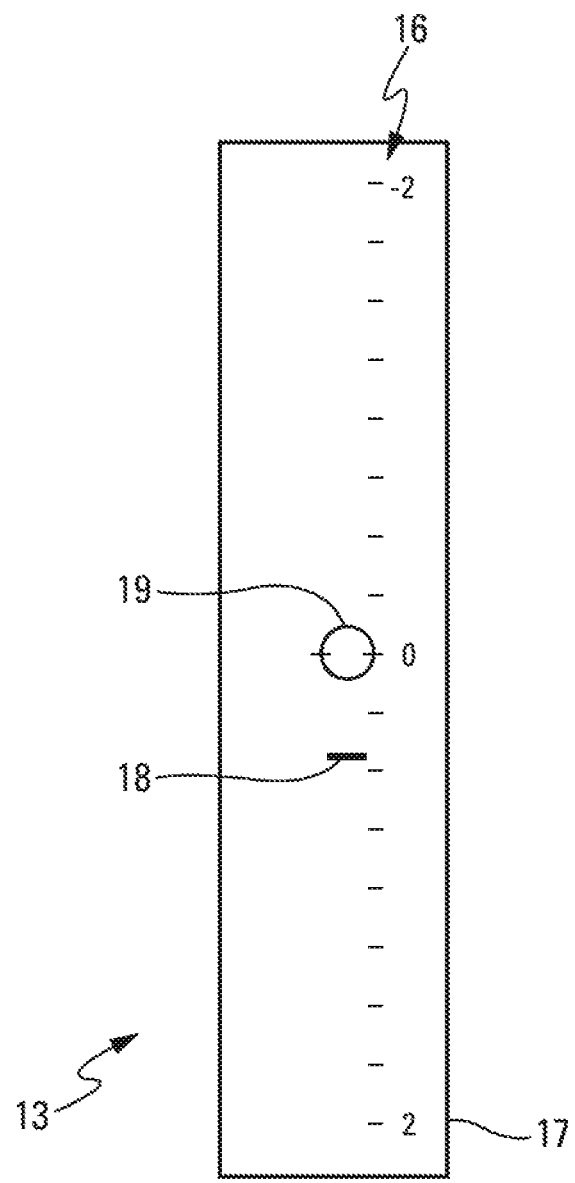
FIG. 3 schematically illustrates an exemplary display, likely to be produced by a piloting assistance device.

The display unit 13 ("DISPLAY") comprises at least one screen 17 installed in the cockpit of the aircraft AC, and it is configured to present, on at least one flight director value scale 16, which is displayed on the screen 17, as represented in FIG. 3, an indicator 18 representative of said flight director value FD, computed by the computation unit 12.

In a preferred embodiment, when the target load factor value is 0 g, the flight director value FD is a value close to the load factor. The display unit 13 thus allows the pilot to view both the current flight director value relative to the target flight director value, and an approximate value of the current load factor value relative to the target load factor value (0 g). In a preferred embodiment, represented in FIG. 3, the scale 16 is displayed vertically. The indicator 18 is displayed on this vertical scale 16 which also displays a fixed indicator 19, which illustrates the reference value of the flight director (which is therefore nil in this example). Another type of display of the scale and of the indicators is also possible.

The indicator 18 and the indicator 19 are represented, for example, in the form of a bar or circle, or any other graphic element, and have identical or different forms and/or colors. Furthermore, the scale 16 can be graduated (as represented in FIG. 3 where it is graduated according to a value expressed in g) or not.

Thus, by virtue of the device 1, the flight director value FD (which is such that it cancels out when the control surfaces 4 of the aircraft AC are in an optimal position for making the aircraft AC fly according to a parabolic flight sought, making it possible for example to create a weightlessness) is computed in real time during the flight, and is adapted to the current situation of the aircraft AC, and notably to its current (vertical) load factor. This flight director value FD is supplied to the pilot via the indicator 18 which thus indicates, at any time, the action to be performed (via the control column 2) to cancel the FD value (that is to say make it equal to the reference flight director value) and thus perform an optimal piloting of the aircraft AC.

Consequently, the device 1 provides assistance to the pilot by indicating to him or her, in real time, directly and accurately, what action(s) he or she must apply, notably to the control column 2, to perform the desired parabolic flight.

Moreover, the device 1 comprises a data input unit 20 ("INPUT") which allows an operator, in particular a pilot of the aircraft, to enter data into the device 1, and in particular into the computation unit 12 (via a link 21). This data input unit 20 can correspond to any standard means (control ball, touch screen, keyboard, etc.) allowing data to be input.

The set 11 of information sources which supplies information to the computation unit 12, via the link 14, and notably the current values of parameters of the aircraft AC, comprises in particular an inertial unit and an anemobarometric unit of ADC ("Air Data Computer") type, as specified hereinbelow.

In a preferred embodiment, the computation unit 12 comprises computation elements (integrated and not represented) for computing said load factor value FD ("flight director"), using the following expression:

$$FD = K \times \left[1 + \frac{Nz}{1+\tau_1 \cdot s} - Nzt + \left(k_q \times k_1 \times \frac{V_{TAS}}{g} \times \frac{q}{1+\tau_2 \cdot s} \times \frac{\tau_1 \cdot s}{1+\tau_1 \cdot s}\right)\right]$$

in which:
K is a constant representing a scale factor, which is chosen so as to offer a good view of the FD value by the pilot;
Nz is the current load factor, which is supplied by the inertial unit, forming part of the set 11 of information sources;
Nzt is the target load factor, which is nil for a 0 g flight;
$V_{TAS}$ is a current true speed ("True Air Speed") of the aircraft AC, which is supplied by the anemobarometric unit forming part of the set 11 of information sources;
q is a current pitch speed of the aircraft AC, which is supplied by the inertial unit (forming part of the set 11 of information sources);
$k_q$ and $k_1$ are predetermined constants, dependent on the units in which the information supplied by the set 11 of information sources are given; and
$\tau_1$ and $\tau_2$ are time constants.

As specified hereinbelow:
$\tau_1$ is involved in the filtering of the vertical load factor in case of turbulences. This time constant remains normally less than or equal to one second. In effect, it has been found that a constant that is too high (greater than 1) generates too strong a filtering which excessively separates the FD value from the real value of the load factor. On the contrary, an excessively low filtering value (for example less than 0.5 seconds) does not allow for a sufficient filtering of the turbulences. The precise choice of the value of this constant is made as a function of the level of turbulences to which the aircraft is subjected; and
$\tau_2$ is involved in the correcting of a time offset generated by the filtering of the vertical load factor. This time constant is chosen close to the value of $\tau_2$ for the aircraft cruising flight, which is determined by the flight mechanics equations. It is, for example, equal to 1.5 seconds.

The constants K, $k_q$, $\tau_1$ and $\tau_2$ can depend on the current flight phase of the aircraft AC.

To filter the disturbances linked to the turbulences, the computation unit 12 filters the value $N_Z$ of the load factor (the index z illustrates the vertical component) given by the inertial unit. The filtered value is $$\frac{Nz}{1+\tau_1 \cdot s}$$

(which is a Laplace representation of the filter with $\tau_1$ the time constant of the filter and s a derivative).

As indicated above, the filtering can be, for example, at 1 second. A value of $\tau_1$ between 0.5 seconds and 1 second can also be envisaged.

This filtering attenuates the oscillations of the turbulences, but creates a time offset of $$\frac{Nz}{1+\tau_1 \cdot s}$$

relative to Nz.

To correct the time offset generated by the filter, the computation unit 12 generates a phase advance by combining the filtered value of the load factor Nz with a derivative of an estimated load factor value.

The estimated load factor value $\hat{N}z$ is computed using flight mechanics equations, from the following expression:

$$\hat{N}z = \frac{V_{TAS}}{g} \times \frac{q}{1+\tau_2 \cdot s}$$

in which:
$V_{TAS}$ is the current true speed of the aircraft, expressed in m/s and received from the set 11 via the link 14;
q is the current pitch speed of the aircraft, expressed in rads and received also from the set 11 via the link 14; and $$\frac{q}{1+\tau_2 \cdot s}$$

is the filtered pitch speed. The choice of the time constant is a setting which is adapted to the situation concerned, for example 2.5 seconds or 1.5 seconds.

By using, in the abovementioned expression of the estimated value $\hat{N}z$, knots instead of meters/second (namely a ratio of 0.5144) and degrees instead of radians (namely a ratio of 57.3), the estimated value $\hat{N}z$ becomes:

$$\hat{N}z = \frac{V_{TAS}}{g} \times \frac{q}{1+\tau_2 \cdot s} \times k_1$$

in which $$k_1 = \frac{0.5144}{57.3}.$$

To generate a phase advance (for the movements at low frequencies only), the computation unit 12 computes the derivative of this estimated value $\hat{N}z$:

$$k_q \times \hat{N}z \times \frac{\tau_1 \cdot s}{1+\tau_1 \cdot s}$$

with $k_q$ a gain, which lies between 0.5 and 1. This gain is set empirically, as a function of simulator results, an excessively low value not allowing for the correction of the delay, and an excessively high value leading to an offset with the true value at the end of a parabolic flight phase.

In the deceleration phase (rapid transition from 1.8 g to 0 g), a significant phase advance is useful to avoid exceeding the 0 g flight, which assumes, for example, a gain $k_q$ close to 1 or equal to 1. On the other hand, in the 0 g flight maintaining phase, it is preferable to have a smaller phase advance, which assumes, for example, a gain $k_q$ close to 0.5 or equal to 0.5.

The derivative value of the load factor is thus computed (from flight mechanics equations), using data (the pitch speed q) supplied by the inertial unit and data (the true speed $V_{TAS}$) supplied by the anemobarometric unit.

The device 1 thus performs a filtering of the turbulences, and it eliminates undesirable reverse effects, when the pilot acts on the control column 2.

It is known that the turbulences generate oscillations at high frequencies (noise) of the load factor. If the pilot tries to correct these oscillations, simply by trying to keep the load factor at 0 g, his or her actions are necessarily offset in time relative to the load factor variations which maintains, even accentuates, the oscillations. This time offset is amplified by a reverse effect of an action of the pilot. In effect:
a pull-up action to correct a loss of load factor, leads briefly (for approximately one second) to a loss of lift and therefore an additional loss of load factor, before nose lift generates an increase in the load factor; and
a pitch-down action leads first of all to an increase in the lift and therefore an increase in the load factor, which counters the desired load factor reduction.

The device 1 makes it possible to remedy this drawback by displaying an indicator 18 which indicates to the pilot an appropriate approximate value of the real current load factor (measured by the inertial unit). To obtain this approximate value the real value of the current load factor has undergone two corrections:
a filtering to attenuate the high frequency variations (for example a filtering at one second making it possible to filter the variations due to the turbulences); and
a correction of the signal delay, generated by the filtering.

Figure 4:
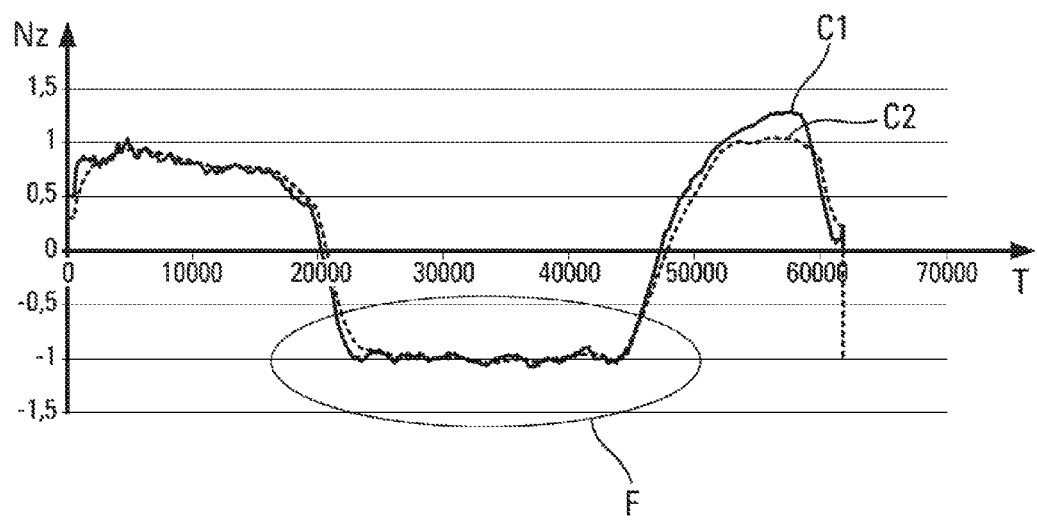
FIG. 4 is a graph illustrating the variation of the vertical load factor as a function of time in a parabolic flight, which makes it possible to highlight the effect obtained by the filtering on the variations at high frequencies.
Figure 5:
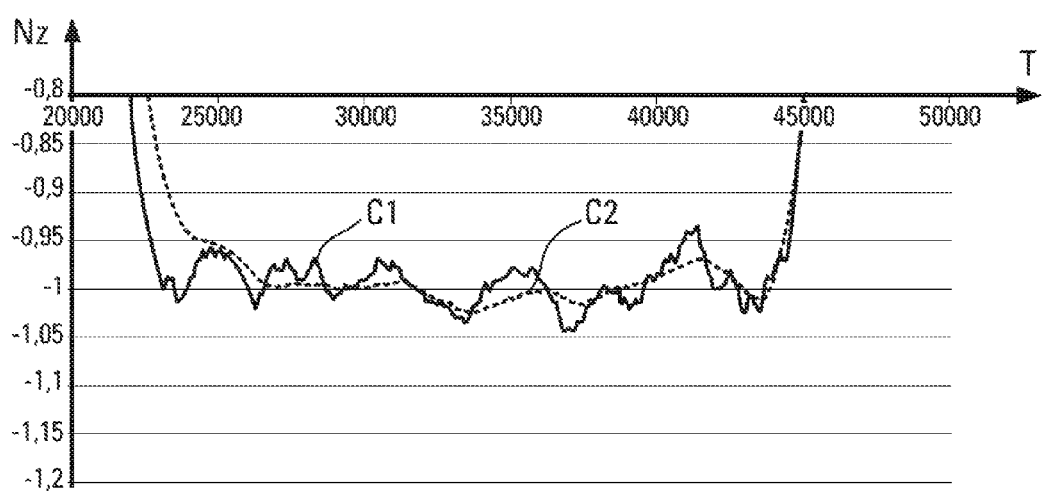
FIG. 5 shows, in an enlarged view, a part of the graph of FIG. 4.

FIGS. 4 and 5 make it possible to highlight the attenuation of disturbances linked to turbulences, as obtained by the device 1. These FIGS. 4 and 5 are graphs illustrating the variation of the vertical load factor Nz (expressed in g) as a function of time T (expressed in milliseconds), following the example of two curves C1 and C2. C1 illustrates the variation of the load factor generated on the aircraft for a parabolic flight exhibiting turbulences of relatively low values, and C2 illustrates the load factor variation for the load factor value FD (after filtering and correction) in a similar situation. In particular, in FIG. 5 which shows an enlarged view of a part F of FIG. 4, the effect of the filtering of the disturbances obtained by the computation of FD is clearly visible.

The flight director value FD, as displayed, is therefore supplied by the abovementioned equation:

$$FD = K \times \left[ 1 + \frac{Nz}{1+\tau_1 \cdot s} - Nzt + \left( k_q \times k_1 \times \frac{V_{TAS}}{g} \times \frac{q}{1+\tau_2 \cdot s} \times \frac{\tau_1 \cdot s}{1+\tau_1 \cdot s} \right) \right]$$

in which:
Nzt is the load factor value sought, which is nil for a 0 g flight; and
K is a scale factor for increasing or reducing the zoom of the display produced on the screen 17.

The coefficients $k_q$ and K can be chosen with different values for the different phases of the flight, namely, for a 0 g flight:
- a deceleration phase (rapid transition from 1.8 g to 0 g); and
- a 0 g maintaining phase.

This difference is reflected in two different displays of the FD value, with a small deviation due to the different coefficients:
- a display with a small scale (graduated for example between 2.5 g and −2.5 g) for the deceleration and acceleration phases; and
- a display with a large scale (graduated for example between 0.1 g and −0.1 g) for the 0 g maintaining phase.

The operation of the device 1, as described above, is as follows. In a parabolic flight, the computation unit 12 computes in real time, as a function of the real situation of the aircraft, the flight director value FD, which is displayed on the screen 17 via the indicator 18. The piloting technique implemented by the pilot is then simple. The pilot acts on the aircraft, in particular on the control column 2, to bring the indicator 18 to the level (at the same height for a vertical scale 16) of the position of the indicator 19 supplying the reference value (which is nil in the example considered), that is to say to bring the flight director value FD to zero and keep it there. By acting thus to keep the flight director value FD at zero, the pilot keeps the aircraft on the trajectory sought for the parabolic flight, with a vertical load factor equal to the target load factor, for example 0 g, without in any way reacting to all the disturbances generated by the turbulences (because of the abovementioned filtering performed).

In the embodiment described above, the computation of the flight director value FD is performed by using constants, notably K, $k_q$, $\tau_1$ and $\tau_2$. These constants may also, in other embodiments of the invention, be variable during the flight of the aircraft, for example to adapt best to the different flight phases of the aircraft.

The device 1, as described above, thus notably offers the following advantages:
- it performs a filtering of the turbulences;
- it eliminates the undesirable reverse effects, when the pilot acts on the control column 2;
- the device 1 can be applied to any type of aircraft. It does not depend on the aircraft and its characteristics. Characteristics specific to the aircraft are in fact not taken into account in the computation of the flight director value FD;
- the flight director value FD takes account of the load factor actually felt by the aircraft (closed loop), by taking account of factors such as the movements of the air (except for the high frequency oscillations);
- the device 1 makes it possible to perform 0 g flights, but also parabolic flights with a constant g value different from 0 g; and
- to perform the piloting, the pilot only has to follow a single indicator, namely the indicator 18 on the screen 17.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used or steps and in any order unless the disclosure or context suggests otherwise. This disclosure hereby incorporates by reference the complete disclosure of any patent or application from which it claims benefit or priority.

The invention claimed is:

1. A method for assisting in the piloting of an aircraft in a parabolic flight, wherein the method comprises a series of steps, implemented automatically and repetitively, in a parabolic flight of the aircraft and consisting in real time:
   a) determining, by a pilot assistance device, at least one current vertical load factor of the aircraft;
   b) computing, by a computation unit, a flight director value using said current vertical load factor and a target vertical load factor, by applying a filtering to said current vertical load factor to attenuate variations at high frequencies and by performing a correction to correct a time offset generated by the filtering, the target vertical load factor being a vertical load factor desired for the aircraft in the parabolic flight, said flight director value being computed in such a way as to be equal to a reference value when the current vertical load factor becomes equal to said target vertical load factor, said correction being performed using a correcting term which is proportional to a derivative of an estimated load factor value; and
   c) presenting, by the pilot assistance device, on at least one load factor scale, displayed on a screen of the cockpit, a first indicator representative of said flight director value, computed in the step b), and a second indicator indicating said reference value.

2. The method as claimed in claim 1, wherein said target vertical load factor is nil.

3. A method for assisting in the piloting of an aircraft in a parabolic flight, wherein the method comprises a series of steps of, implemented automatically and repetitively, in a parabolic flight of the aircraft and in real time,
   a) determining, by a pilot assistance device, at least one current vertical load factor of the aircraft;
   b) computing, by a computation unit, a flight director value using said current vertical load factor and a target vertical load factor, by applying a filtering to said current vertical load factor to attenuate variations at high frequencies and by performing a correction to correct a time offset generated by the filtering, the target vertical load factor being a vertical load factor desired for the aircraft in the parabolic flight, said flight director value being computed in such a way as to be equal to a reference value when the current vertical load factor becomes equal to said target vertical load factor; and
   c) presenting, by the pilot assistance device, on at least one load factor scale, displayed on a screen of the cockpit, a first indicator representative of said flight director value, computed in the step b), and a second indicator indicating said reference value,
   wherein the step b) includes computing said flight director value FD, using the following expression:

$$FD = K \times \left[1 + \frac{Nz}{1 + \tau_1 \cdot s} - Nzt + \left(k_q \times k_1 \times \frac{V_{TAS}}{g} \times \frac{q}{1 + \tau_2 \cdot s} \times \frac{\tau_1 \cdot s}{1 + \tau_1 \cdot s}\right)\right]$$

in which:
K is a constant representing a scale factor;
Nz is the current vertical load factor;
Nzt is the target vertical load factor;
$V_{TAS}$ is a current true speed of the aircraft;
q is a current pitch speed of the aircraft;
$k_q$ and $k_1$ are predetermined constants; and
$\tau_1$ and $\tau_2$ are time constants.

4. The method as claimed in claim 3, wherein at least one of said constants K, $k_q$, $\tau 1$ and $\tau 2$ depends on a current flight phase of the aircraft.

5. The method as claimed in claim 3, wherein said target vertical load factor is nil.

6. A device for assisting in the piloting of an aircraft in a parabolic flight, the device comprising:
   a set of information sources, configured to determine automatically, in real time, at least one current vertical load factor of the aircraft;
   a computation unit configured to compute automatically, in real time, a flight director value using said current vertical load factor and a target vertical load factor, the target vertical load factor being a vertical load factor desired for the aircraft in the parabolic flight, said flight director value being computed in such a way as to be equal to a reference value when the current vertical load factor becomes equal to said target vertical load factor, the computation unit being configured to apply a filtering to said current vertical load factor to attenuate variations at high frequencies and to perform a correction to correct a time offset generated by the filtering, said correction being performed using a correcting term which is proportional to a derivative of an estimated load factor value; and
   a display unit configured to present automatically, in real time, on at least one load factor scale, displayed on a screen of the cockpit, a first indicator representative of said flight director value, computed by said computation unit, and a second indicator indicating said reference value.

7. A manual piloting system of an aircraft, said manual piloting system comprising:
   at least one control column configured for being actuated by a pilot to modify a position thereof and configured to act on at least one elevator to generate a piloting of the aircraft on the pitch axis as a function of the position of said control column; and
   at least one piloting assistance device comprising:
      a set of information sources, configured to determine automatically, in real time, at least one current vertical load factor of the aircraft;
      a computation unit configured to compute automatically, in real time, a flight director value using said current vertical load factor and a target vertical load factor, the target vertical load factor being a vertical load factor desired for the aircraft in the parabolic flight, said flight director value being computed in such a way as to be equal to a reference value when the current vertical load factor becomes equal to said target vertical load factor, the computation unit being configured to apply a filtering to said current vertical load factor to attenuate variations at high frequencies and to perform a correction to correct a time offset generated by the filtering; and
      a display unit configured to present automatically, in real time, on at least one load factor scale, displayed on a screen of the cockpit, a first indicator representative of said flight director value, computed by said computation unit, and a second indicator indicating said reference value,
   wherein computing said flight director value FD includes using the following expression:

$$FD = K \times \left[1 + \frac{Nz}{1+\tau_1 \cdot s} - Nzt + \left(k_q \times k_1 \times \frac{V_{TAS}}{g} \times \frac{q}{1+\tau_2 \cdot s} \times \frac{\tau_1 \cdot s}{1+\tau_1 \cdot s}\right)\right]$$

in which:
K is a constant representing a scale factor;
Nz is the current vertical load factor;
Nzt is the target vertical load factor;
$V_{TAS}$ is a current true speed of the aircraft;
q is a current pitch speed of the aircraft;
$k_q$ and $k_1$ are predetermined constants; and
$\tau_1$ and $\tau_2$ are time constants.

* * * * *